United States Patent [19]

Tanaka et al.

[11] Patent Number: 5,099,416
[45] Date of Patent: Mar. 24, 1992

[54] AN OPERAND STORAGE COMPARE (OSC) DETECTING DEVICE USING COLUMN AND ROW SIGNALS IN A BUFFER STORAGE

[75] Inventors: Atsushi Tanaka; Tsuyoshi Watanabe; Yasuo Watabe; Yuka Sato, all of Hadano, Japan

[73] Assignees: Hitachi, LTD., Tokyo; Hitachi Computer Engineering Co., Ltd., Kanagawa, both of Japan

[21] Appl. No.: 409,346

[22] Filed: Sep. 19, 1989

[30] Foreign Application Priority Data

Sep. 21, 1988 [JP] Japan .................... 63-237164

[51] Int. Cl.⁵ .................... G06F 9/34; G06F 12/00
[52] U.S. Cl. .................... 395/425; 364/239; 364/239.4; 364/238.6; 364/DIG. 1
[58] Field of Search ... 364/200 MS File, 900 MS File; 365/189.05, 230.01, 230.08, 231, 238

[56] References Cited

U.S. PATENT DOCUMENTS

| 4,200,927 | 4/1980 | Hughes et al. | 364/200 |
| 4,618,926 | 10/1986 | Kubo et al. | 364/200 |
| 4,803,621 | 2/1989 | Kelly | 364/200 |
| 4,894,770 | 1/1990 | Ward et al. | 364/200 |
| 4,916,606 | 4/1990 | Yamaoka et al. | 364/200 |
| 4,991,090 | 2/1991 | Emma et al. | 364/200 |
| 5,005,117 | 4/1991 | Ikumi | 364/200 |

Primary Examiner—Michael R. Fleming
Assistant Examiner—Gopal C. Ray
Attorney, Agent, or Firm—Antonelli, Terry, Stout & Kraus

[57] ABSTRACT

A buffer storage controller includes a read-out buffer address array, a write-in buffer address array and a buffer storage. An operand storage compare (OSC) detecting section compares a column signal and a row signal outputted from the read-out buffer address array to the buffer storage with those outputted by the write-in buffer address array to obtain an OSC detection signal.

7 Claims, 4 Drawing Sheets

F I G. 2
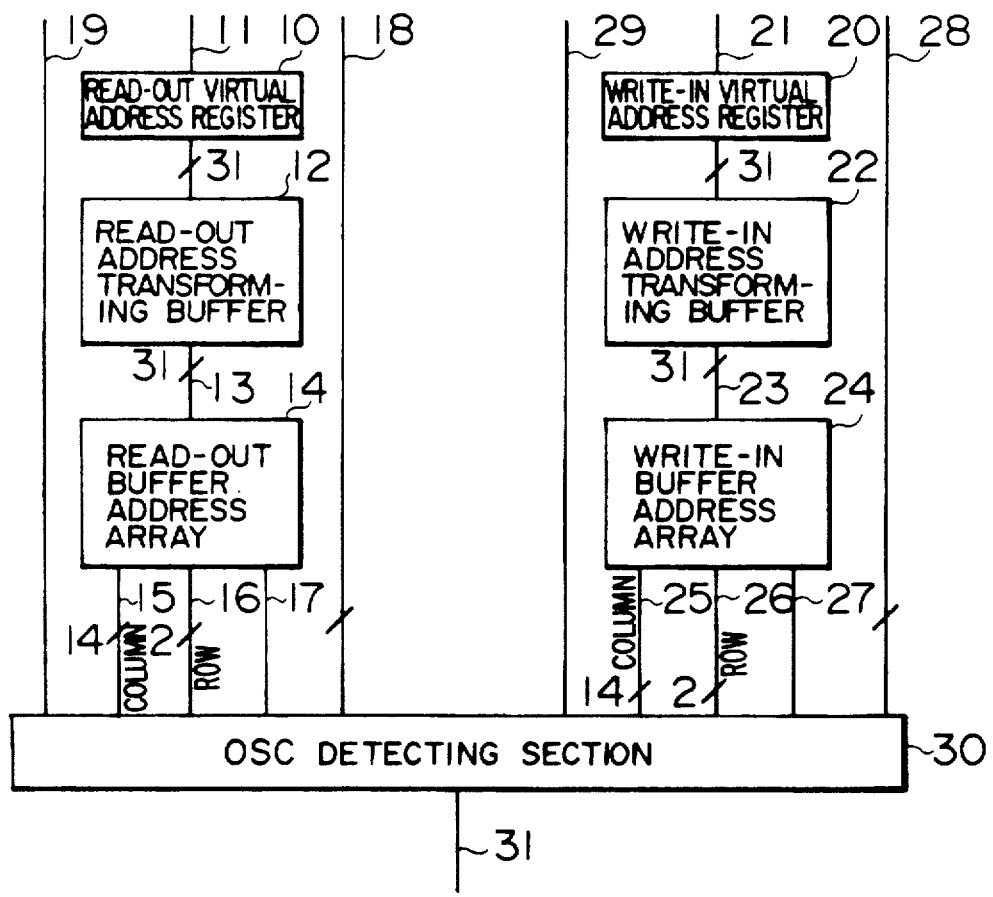

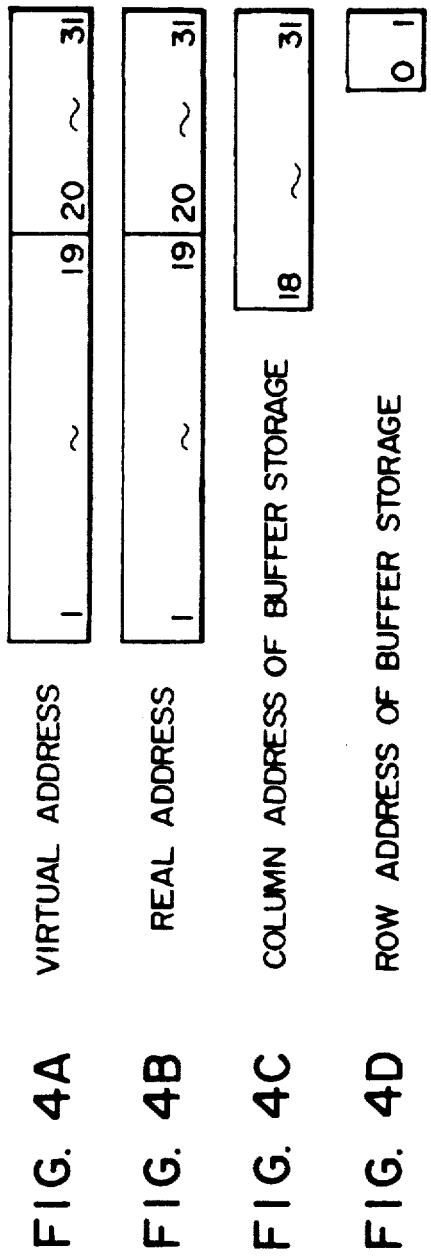

AN OPERAND STORAGE COMPARE (OSC) DETECTING DEVICE USING COLUMN AND ROW SIGNALS IN A BUFFER STORAGE

BACKGROUND OF THE INVENTION

The present invention relates to a pipe-line type information processing apparatus and in particular to a system, in which, when operand data of a certain instruction is read out in a buffer memory control device having a buffer address array and a buffer memory, it is detected whether the operand data to be read out should be rewritten by a preceding instruction or not.

In a pipe-line type information processing apparatus, it is possible to increase instruction processing capacity by reading-out operand data of succeeding instructions without waiting for the termination of the execution of a certain instruction. However, in such an information processing apparatus, when operand data is read out by the execution of a certain instruction, it is necessary to detect that the read-out operand data is to be rewritten in memory by the preceding instruction whose execution is not yet terminated. This detection is called OSC (Operand Store Compare). The detection of the OSC can be effected by comparing the first address and the last address of the write-in, operand data of the preceding instruction effecting the write-in with the first address and the last address of the read-out operand data of the succeeding instruction, respectively.

Hereinbelow, in an information processing device using the virtual memory method, an architecture is dealt with, in which a plurality of virtual addresses correspond to one real address and the OSC should be judged in the real address space.

Heretofore, in an information processing apparatus based on the architecture stated above, the OSC judgment was effected on address bits, which are not transformed, in the case where the virtual address is transformed into a real address, among all the bit addresses of the virtual address. For example, supposing that a virtual address consists of 31 bits, in the case where the less significant 12 bits (bits 20 to 31) are address bits, which are not subjected to the address transformation, and the more significant 19 bits (bits 1 to 19) are address bits, which are subjected thereto, the virtual address and the corresponding real address are identical in the bits 20 to 31 and different in general in the bits 1 to 19. In this case, heretofore, when the address of the read-out operand data is compared with the address of the write-in operand data, the OSC detection was effected on the bits 20 to 31 in the two virtual addresses, which are to be compared.

As a publication relating to the OSC detection e.g. JP-A-57-200982 can be cited.

By the prior art technique described above, since the OSC detection is effected by comparing a part of the virtual addresses, although the detection speed is raised, this means that the OSC is detected excessively. That is, useless OSC detection outputs are issued in addition to the correct OSC detection outputs. Now, when an OSC is detected, the memory read-out of the succeeding reading-out instruction is obliged to be wait for that the preceding writing-in instruction is executed and written in the memory. If the OSC is detected excessively, the succeeding instruction can be obliged to wait uselessly, which decreases the instruction processing efficiency.

Further, when the OSC is detected, in order to eliminate the delay of the operand data reading-out operation by the succeeding instruction, the read-out data can be obtained by replacing the part changed by the write-in in the data read-out from the memory by the write-in data (JP-A-57-200982), which causes erroneous operation by an excessive OSC detection.

Although the excessive OSC detection can be prevented by comparing all the bits of the real addresses after the address transformation is completed, this enlarges the scale of the hardware constituting the comparing circuit. For example, when a virtual address is constituted by 31 bits, by the prior art technique stated above it is sufficient to compare 12 bits of 20 to 30 in the virtual address. On the contrary, by the real address after the address transformation, all the 31 bits of 1 to 31 constituting the real addresses are compared and therefore the scale of the hardware constituting the comparing circuit is increased by a factor of about 2.5 with respect to that required by the prior art technique described above.

SUMMARY OF THE INVENTION

It is the object of the present invention to provide an OSC detecting device, which effects no excessive OSC detection and in which the scale of the hardware of the comparing circuit effecting the OSC circuit can be reduced.

In order to achieve the above object, the present invention is characterized in that in a buffer controller having a read-out buffer address array, a write-in buffer address array and a buffer storage, the OSC detection output is obtained on the basis of a pair of a column signal and a row signal to a buffer memory obtained by transforming the read-out real address of the read-out operand data by means of a read-out buffer address array and a pair of a column signal and a row signal to the buffer memory obtained by transforming the write-in real address of the write-in operand data by means of a write-in buffer address array.

The columns and the rows of the real address and the buffer storage correspond to each other one to one. Consequently, the access order to the buffer storage can be secured by the OSC detection based on the column signal and the row signal to the buffer storage. Here the content of the read-out buffer address array and that of the write-in buffer address array are in accordance with each other.

Further the sum of the number of bits of the column address and the number of bits of the row address to the buffer storage is generally smaller than the number of bits of the real address and therefore the scale of the hardware of the comparing circuit is reduced with respect to that required for the OSC detection using all the bits of the real address.

BRIEF DESCRIPTION OF THE DRAWINGS

FIG. 2 is a block diagram of an embodiment of the present invention;

FIGS. 4A to 4D are schemes indicating the relation among the virtual address, the real address, the column address and the row address of the buffer storage.

DESCRIPTION OF THE PREFERRED EMBODIMENT

Figure 1:
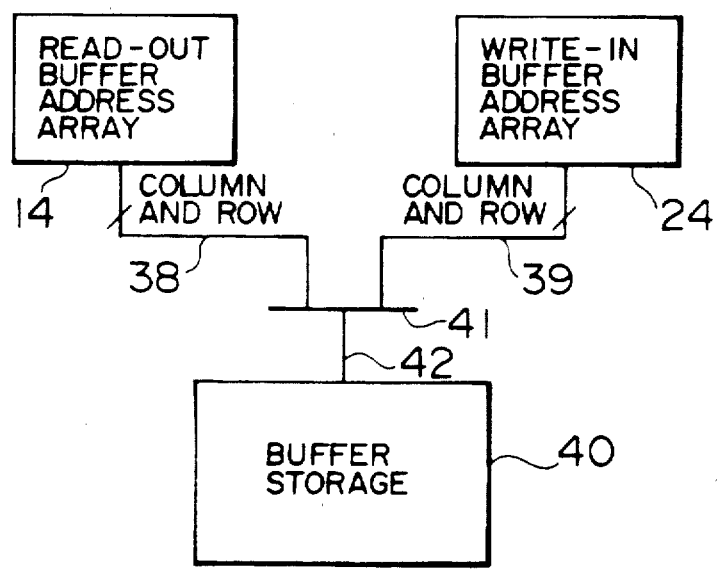
FIG. 1 is a block diagram showing the relation among the read-out buffer address array, the write-in buffer address array and buffer storage in a buffer controller of the type to which the present invention may be applied.

Hereinbelow an embodiment of the present invention will be explained, referring to the drawings.

FIG. 2 is a block diagram illustrating an embodiment of the present invention indicating a case where there exist 2 channels of address transforming buffers and buffer address arrays, one for the read-out and the other for the write-in. In FIG. 2, reference numeral 10 is a read-out virtual address register; 12 is a read-out address transforming buffer; 14 is a read-out buffer address array; 20 is a write-in virtual address register; 22 is a write-in address transforming buffer; and 24 is a write-in buffer address array. Since the construction of these components themselves is well-known, the description thereof will be omitted.

FIG. 1 shows the relation among the read-out buffer address array 14, the write-in buffer address array 24 and a buffer storage 40. The column and row 38 from the read-out buffer address array 14 and the column and row 39 from the write-in buffer address array 24 are selected by a selector 41. Selected columns and rows 42 are inputted in the buffer storage 40.

Figure 3:
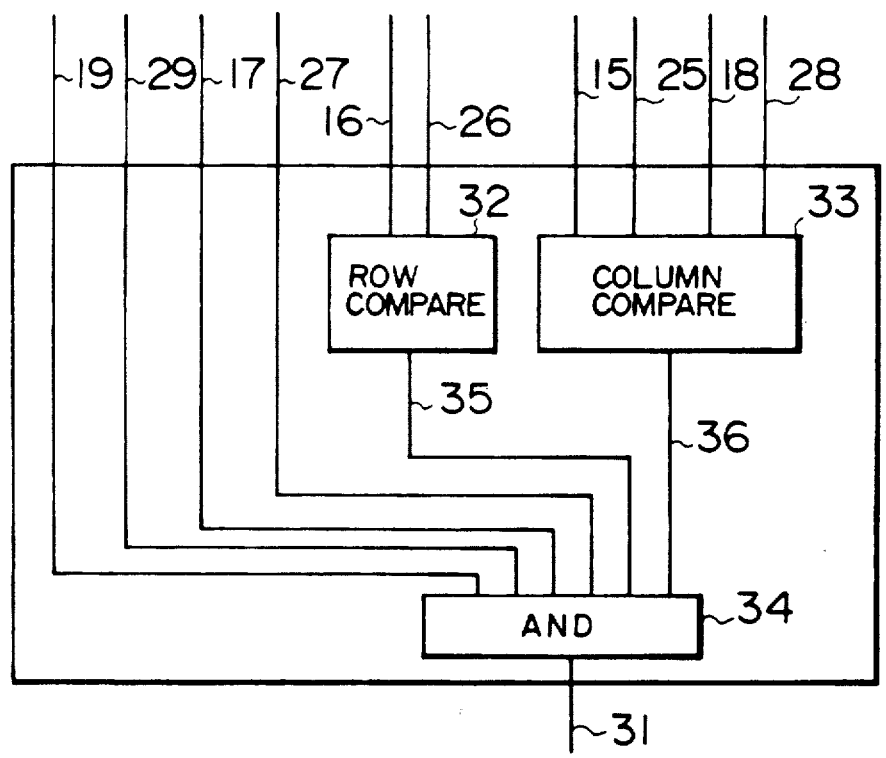
FIG. 3 is a block diagram in detail of the OSC detecting section in FIG. 2.

30 represents an OSC detecting section and the construction in detail thereof is indicated in FIG. 3. Further the formats for the virtual address, the real address, and the column address and the row address to the buffer storage 40 are indicated in FIGS. 4A to 4D.

At first FIG. 2 will be explained. The readout virtual address register 10 is a virtual address register for reading-out the buffer storage and the storage reading-out virtual address is set through a read-out virtual address line 11. A virtual address consists of 31 bits, as indicated in FIG. 4A. The virtual address of the read-out virtual address register 10 is inputted in the read-out address transforming buffer 12, from which the real address is outputted through a real address line 13. A real address consists of 31 bits, as indicated in FIG. 4B. When the virtual address is not registered in the read-out address transforming buffer 12, the address transformation is carried out by well known means and the address is registered in the read-out address transforming buffer 12.

The read-out buffer address array 14 transforms the real address of 31 bits on the real address line 13 into a column of 14 bits and a row of 2 bits to the buffer storage. They are outputted through a column line 15 and a row line 16. At the same time, in the case where the real address is registered in the readout buffer address array 14, (i.e. in the case where it makes a hit), a buffer address array register line 17 is set at "1" and when the real address is not registered, it is set at "0". A buffer storage consists of 14 columns and 4 rows. The row of the buffer storage 40 is indicated, encoding 4 rows in 2 bits. A read-out request line 19 is "1", in the case where there exists a read-out request to the buffer storage, and "0", in the case where there exists no request.

On the other hand, the write-in virtual address register 20 is an address register for writing-in the buffer storage and the storage write-in virtual address is set through a write-in virtual address line 1. This virtual address is inputted in the write-in address transforming buffer 22 and the real address is outputted through a real address line 23. The write-in buffer address array 24 transforms the real address on the real address line 23 into a column and a row to the buffer storage 40 and outputs them through a column line 25 and a row line 26. At the same time, in the case where the real address is registered in the write-in buffer address array 24, the buffer address array register line 27 is set at "1" and when the real address is not registered, it is set at "0". A write-in request line 29 is "1", in the case where there exists a write-in request to the buffer storage, and "0", in the case where there exists no request.

A read-out operand data length line 18 and a write-in operand data length line 28 give lengths of the read-out operand data and the write-in operand data (number of bits), respectively.

Next the OSC detecting section 30 will be explained, referring to FIG. 3. A comparing circuit 32 judges agreement of read-out and write-in rows to the buffer storage on the lines 16 and 26, respectively, with each other and outputs the result of the judgment through a comparison result output line 35. A comparing circuit 33 judges superposition of the read-out and the write-in operand data by using read-out and write-in columns to the buffer storage 40 on lines 17 and 27, respectively, and read-out and write-in operand data lengths on lines 18 and 28, respectively, and outputs the result of the judgment through a comparison result output line 36. When there exist both the read-out request and the write-in request and both of them exist in the buffer storage, the results on the comparison result output lines 35 and 36 are valid. That is, when all the read-out request line 9, the write-in request line 29, the read-out buffer address array register line 15, the write-in buffer address array register line 25 and the comparison result output lines 35 and 36 are at "1", the OSC detection line 31, which is the output of an AND circuit 34, is at "1".

Here, as indicated in FIGS. 4C and 4D, in the case where the buffer storage consists of 14 columns and 4 rows, the number of bits used for the OSC detection is 16 and the scale of the hardware of the comparing circuits 32 and 33 is about ½ of that required for the real address of 31 bits.

As is clear from the above explanation, according to the present invention, it is possible to detect the OSC of the buffer storage without detecting it excessively. Further it is possible to reduce the scale of the hardware of the comparing circuit with respect to that required for the OSC detection, by which the real address is compared.

What is claimed is:

1. An operand store compare (OSC) detecting device in a buffer controller, comprising:
   a buffer storage accessed by columns and rows;
   a read-out buffer address array responsive to first real address representing read-out operand data of a first instruction for transforming the first real address into a first pair including a column address and a row address and for outputting said first pair to said buffer storage;
   a write-in buffer address array responsive to a second real address representing write-in operand data of a second instruction for transforming said second real address into a second pair including a column address and a row address and for outputting said second pair to said buffer storage; and
   an OSC detecting section connected with said read-out buffer address array and said write-in buffer address array for comparing said first pair of a column address and a row address with said second pair of a column address and a row address to output a detection signal when both the pairs coincide with each other.

2. An OSC detecting device according to claim 1, wherein said first pair of a column address and a row address represents the starting address of said read-out operand data in said buffer storage and said second pair of a column address and a row address represents the starting address of said write-in operand data in said buffer storage.

3. An OSC detecting device according to claim 2, wherein said OSC detecting section includes:
   first comparing means for comparing said first row address with said second row address;
   second comparing means for comparing said first and said second column addresses, and a signal representing the length of said read-out operand data and a signal representing the length of said write-in operand data to determine whether said read-out operand data and said write-in operand data are superposed on each other or not; and
   a logic circuit connected with said first and said second comparing means, and receiving a read-out request signal for said read-out operand data and a write-in request signal for said write-in operand data, signals representing whether said first and said second real addresses have hit their respective buffer address arrays or not, and comparison outputs from said first and said second comparing means, for effecting logical calculations to output said OSC detection signal.

4. An OSC detecting device according to claim 1, wherein said second instruction is a succeeding instruction of said first instruction.

5. An OSC detecting device according to claim 1, wherein the content of said read-out buffer address array and the content of said write-in buffer address array are coincident with each other.

6. An operand store compare (OSC) detecting device in a buffer controller, comprising:
   a buffer storage constituted by columns and rows;
   first register means for holding a first address representative of read-out operand data of a first instruction;
   second register means for holding a second address representative of write-in operand data of a second instruction;
   first means connected between said first register means and said buffer storage and responsive to said first address, for outputting a first pair of a column signal and a row signal indicating the column and row of said read-out operand data stored in said buffer storage;
   second means connected between said second register means and said buffer storage and responsive to said second address, for outputting a second pair of a column signal and a row signal indicating the column and row of said write-in operand data stored in said buffer storage; and
   an OSC detecting section connected to said first and second means for comparing said first and second pairs to output a detection signal for inhibiting a read-out operation of said first instruction before a write-in operation of said second instruction, when both the pairs coincide with each other.

7. An OSC detecting device according to claim 6, wherein said first means includes:
   a read-out address transforming buffer for transforming the first address held in said first register means into a first real address; and
   a read-out buffer address array responsive to said first real address, for detecting a column and a row of data in said buffer storage corresponding to said read-out operand data; and
   said second means includes:
   a write-in address transforming buffer for transforming the second address held in said second register means into a second real address; and
   a write-in buffer address array responsive to said second real address, for detecting a column and a row of data in said buffer storage corresponding to said write-in operand data.

* * * * *